July 18, 1944.   C. M. WOOD ET AL   2,353,951
METHOD OF APPLYING SURFACE FINISH TO PIPE
Filed March 30, 1942

Clyde M. Wood &
Charles L. Jones
Inventors

By W. B. Harpman

Attorney

Patented July 18, 1944

2,353,951

UNITED STATES PATENT OFFICE 2,353,951

METHOD OF APPLYING SURFACE FINISH TO PIPE

Clyde M. Wood, Youngstown, Ohio, and Charles L. Jones, Wilmington, Del.; said Wood assignor to "Automatic" Sprinkler Company of America, Youngstown, Ohio, a corporation of Delaware Application March 30, 1942, Serial No. 436,868

1 Claim. (Cl. 117—97)

This invention relates to a finish for pipes, tubes, conduits, and similar equipment and particularly to a method of applying the finish to such articles.

The principal object of the invention is the provision of a method of simultaneously hardening, impregnating, and covering the surfaces of a pipe, tube, conduit, or similar article.

A further object of the invention is the provision of a method of building up a protective covering on the surfaces of pipes, tubes, conduits, and similar articles.

A still further object of the invention is the provision of a method of mixing a coating material with the structural material of a pipe, tube, or conduit and particularly as concerns the interior surfaces thereof.

A still further object of the invention is the provision of a method of treating the surfaces of pipes, tubes, conduits, and similar articles, to prevent oxidation, smoothing out irregular surfaces and generally form a slick surface in the said articles so as to reduce friction loss as concerns materials handled by the said articles.

It is well known that various pipes, tubes, and similarly formed articles are used for conveying fluids, gases, and solids and that, generally speaking, the pipes, tubes, and similar articles in general use, have relatively irregular inner surfaces against which the material being conveyed must necessarily come in contact. Even in conveying fluids surface friction resulting from an irregular interior surface of a pipe can and does increase the pressure necessary to establish a given flow and in direct relation thereto less fluid can be handled as irregularities develop on the interior surface of the pipe due to the fact that, generally speaking, the pressure can not be increased above the original amount without increasing the cost of pumping or otherwise moving the fluid. The result heretofore has been the reduction in the delivered quantity of fluid. This is particularly true when pipes corrode, scale, or oxidize which builds up a very uneven and highly irregular surface which greatly increase the frictional loss. The application of and the formation of a relatively hard surface, both protecting and smoothing the surface of the object to which it is applied is therefore the definite object of this invention. The use of various materials are contemplated such as colloidal graphite, various plastics and synthetic resins and the like and other desirable materials of comparable qualities.

With the foregoing and other objects in view which will appear as the description proceeds, the invention resides in the surfacing material applied to pipes, tubes, conduits, and similar articles and in the details of the method of application hereinafter described and claimed, it being understood that changes in the precise embodiment of the invention herein disclosed, can be made within the scope of what is claimed without departing from the spirit of the invention.

The invention is illustrated in the accompanying drawing wherein.

Figure 2:
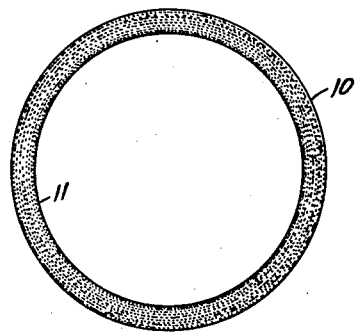
Figure 2 is an end elevation of a section of pipe the normal grain structure thereof being illustrated in a highly exaggerated manner.

By referring to the drawing and Figure 2 in particular, it will be seen that a normal pipe, tube, or conduit, or similar article 10 has been shown in end elevation, the grain structure of which has been purposely highly exaggerated in order to illustrate the fact that the interior surface 11 is normally irregular and thereby offers considerable friction to fluids, gases, or solids moved through the article 10.

Figure 3:
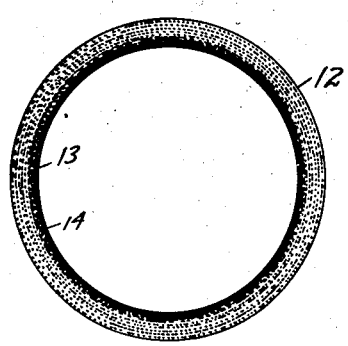
Figure 3 is an end elevation of a section of pipe after the interior surface thereof has been coated, the material of the pipe impregnated with the coating material and a smooth interior surface established, the grain structure, highly exaggerated in the illustration, showing the coating and impregnation of the coating as well as the hardening of the material of the pipe.

By referring to Figure 3 an end elevation of a pipe, tube, conduit, or similar article 12 may be seen wherein the grain structure has been purposely highly exaggerated and wherein a smooth and even interior surface 13 has been formed of colloidal graphite, the graphite material of which surface has actually penetrated the interstices of the metal as indicated at 14.

Figure 1:
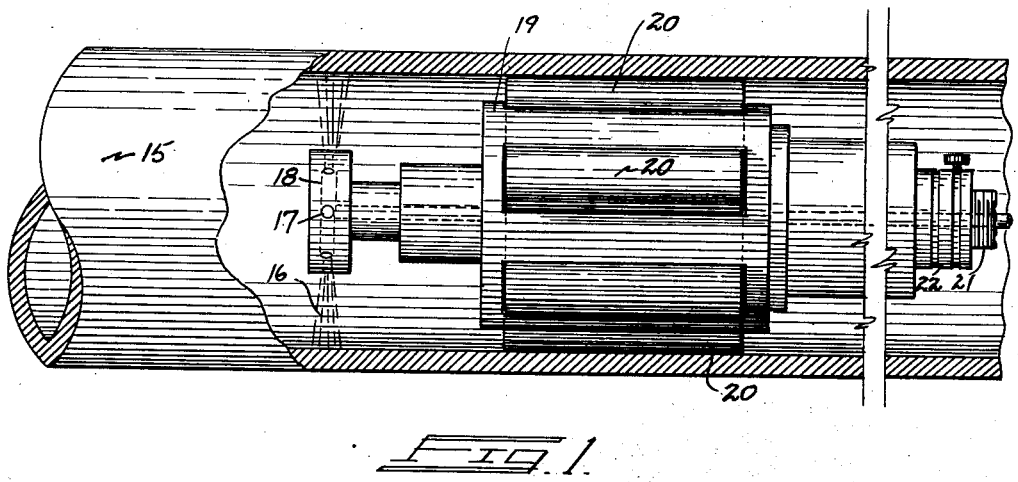
Figure 1 is a side elevation of a pipe with parts broken away and showing in elevation means for simultaneously coating and impregnating and hardening the interior surface of the said pipe.

By referring now to Figure 1 of the drawing, it will be observed that a section of pipe, tube, conduit, or similar article 15 is illustrated a portion of which has been broken away so as to illustrate apparatus capable of applying colloidal graphite to the interior surfaces of the article 15, so as to build up an interior surface such as illustrated in Figure 3, which interior surface of colloidal graphite actually penetrates the interstices or grain structure of the metal.

Still referring to Figure 1 of the drawing, it will be observed that colloidal graphite, in suspension capable of being delivered by the apparatus illustrated, is indicated by the numeral 16 and is shown being applied from openings 17 in a head 18 affixed to and forming a part of a body member 19 which body member 19 is provided with a plurality of rollers 20, the rollers being preferably of an odd number so that no one roller 20 is at any time diametrically opposite another and so that, therefore, the seating of all of the other rollers 20 is not effected by one roller passing over a groove or similar irregularity. The construction of the body member 19 and the associated driving and adjusting portions 21 and 22 respectively causes the rollers to be forced outwardly in an expanding action until they bear against the inside surface of the article 15 to the extent that as the body member 19 carrying the rollers 20 is moved through the article 15, the rollers engage the interior surface thereof and cause the particles of colloidal graphite being deposited against the inner surfaces of the article 15 by the head 18 to fill and penetrate the interstices of the metal of the article 15 and, at the same time, the expanding action of the body member 19 and rollers 20 thereof will cause a compressing and densifying of the metal of the article 15 as the tool passes therethrough. The result will be the elimination of normal irregularities from the interior surfaces of the article 15, the penetration of the metal by the colloidal graphite particles and the formation of a smooth, highly regular surface upon the interior surface of the article 15. It is well known that graphite is an excellent lubricant and inert to practically all chemical substances and is likewise uneffected by either high or low temperatures over a wide range. The obvious result, therefore, of the application to and penetration of the interior surfaces of a pipe or tube or similar article with such a material as graphite will, therefore, be to build up a smooth densified surface which will offer very little frictional resistance to materials being conveyed. It will also be obvious that by combining the advantages of the graphite coating applied to the interior surfaces, together with the mechanical smoothing, aiding in penetration, and densifying of the metal, the frictional effects will be still further reduced to the result that marked economies may be secured in that it will be possible to use smaller sizes of pipes and tubes than heretofore found necessary and generally used in conveying various fluids, gases, and solids and similar materials.

It is within the scope of this invention to heat treat either before, simultaneously, or subsequently, the material and/or the article to which the protective and smoothing application is being applied, under such conditions as may be found desirable and particularly with such metals as the application of heat thereto may prove beneficial in the application of the smoothing and coating of the surfaces thereof. It is believed that the application of heat to the material and or to a metal article to which the protective and smoothing application is being applied will facilitate the penetration of the material used into the interstices of the metal article. The invention also contemplates the application of suitable pressure to the surface being treated by way of pneumatic pressure applied at desirable pressures or the application of various gases under desirable pressures any and all of which may be found to be desirable in assisting in the application of smoothing and coating treatment being applied.

In summary, therefore, the invention resides in the surfacing effected, as well as in the method of application of one of the said surfacing materials, the said method including the simultaneous application of the desirable material and the mechanical smoothing, assisting the migration or penetration of the material into the metal and the densifying of the metal as well and the treatment if desired consisting of heat treating or the application of pressures to the surfaces being treated, the said pressure being other than mechanical; i. e.: pneumatic or hydraulic.

It will thus be seen that pipes, tubes, conduits, and similar articles having their interior surfaces treated in the manner herein set forth will result in greatly offsetting the frictional loss commonly encountered with a definite economic advantage with respect to both the amount of material delivered at a given pressure and the ability of the treated pipe or tube to continue to deliver a given quantity of material at a given pressure over an indefinite time. For example, various pipes commonly employed in sprinkler systems can be considerably reduced in size and thereby effect considerable savings in costs by treating said pipes in accordance with this invention and thus enabling smaller pipes to carry, consistently, predetermined quantities of fluids. It is believed that it is well within the scope of this invention to apply the surfacing treatment herein specified to the exterior surfaces of pipes, tubes, conduits, and similar articles where such a protective exterior coating might be deemed desirable.

Having thus described our invention, what we claim is:

The method of coating and densifying the interior of a tubular metal object which method comprises depositing a suitable suspension of colloidal graphite into the interior surface of the said object and thereafter inserting a member containing radially positioned and radially expansible rotatable members, rotating the said member and thereby expanding and forcing the rotatable members into intimate contact with the entire interior surface of the object, said contact being of sufficient driving force to cause the colloidal graphite particles to penetrate the surface of the metal and also compress and densify the metal surface.

CLYDE M. WOOD.
CHARLES L. JONES.